United States Patent Office 2,961,296
Patented Nov. 22, 1960

2,961,296

PRODUCTION OF FUSED ALUMINA

Michael J. Fenerty, Arvida, Quebec, Canada, assignor to Aluminium Laboratories Limited, Montreal, Quebec, Canada, a corporation of Canada No Drawing. Filed Sept. 27, 1957, Ser. No. 686,603

2 Claims. (Cl. 23—142)

In the production of alumina by procedure which involves calcining alumina hydrate as derived from the Bayer process, an unusual problem has been noted in certain subsequent operations for special purposes. Whereas alumina so obtained, for instance by calcining precipitated alumina trihydrate in a rotary kiln, is a crystalline powder of considerable purity and relatively high whiteness, it has been found that upon a fusing or melting treatment of the alumina, some color or tint often appears in the fused block, and this objectionable color or darkening remains in the particles after crushing and grinding.

An important instance of this fusing treatment of alumina is in the production of white abrasives. The theoretically pure crystalline alumina, i.e. the calcined hydrate, is fused at high temperature, usually in a carbon arc furnace such as the type called a Higgins shell furnace. The fused mass, after cooling, is a block of alumina, which can thereafter be crushed and ground, to appropriate particle size, for abrasive use or for manufacture of abrasive compositions. Industrial demands for this material usually require it to be white, and any color or darkness adversely affects its commercial value.

It will be particularly noted that the coloration mentioned above, usually grey and often quite dark, appears only after the alumina has been fused. As discharged from the calcining kiln it appears absolutely white, and its purity may be high by ordinary standards, yet the experience has been that the darkening in the subsequent fused product can nevertheless occur. Various theories have been expressed as to the origin of this color, but no satisfactory and economical way of eliminating it has been found. There are indications that the difficulty is in part caused by very minor amounts of impurities such as compounds of vanadium, nickel, chromium and particularly iron, being amounts so small, however, that they do not affect the quality of the alumina in respect to the ordinary requirements of purity; while each of these compounds would cause a specific coloration, e.g. vanadium would give a green tinge, nickel, a blue tinge, chromium, a red tinge and iron, a brown tinge, it would appear to be the combined effect of such impurities dominated by the iron coloration which gives an overall grey appearance. Some effort has been made to use special purification steps in making the alumina, but despite extra cost and inconvenience, complete elimination of a grey tinge has not generally resulted, and an effort to solve the problem by extreme purification operations of known sort would be prohibitively expensive.

The present process, therefore, is directed to the attainment of improved results in the manufacture of white fusing alumina, and particularly to an improved treatment of alumina in the course of its production from alumina hydrate, such as to yield a product in which the color on fusing is greatly reduced or eliminated. At the same time, a particular feature of the invention resides in the attainment of these results by an essentially economical process, without the high cost or inconvenience of prior efforts.

As stated, the alumina hydrate, prior to calcination is conventionally produced by the Bayer or similar procedures wherein bauxite or other aluminous material is treated to yield a solution of sodium aluminate, from which the alumina hydrate, usually as trihydrate, is precipitated and separated. The conversion of this material to anhydrous alumina is conveniently performed in a rotary kiln with fuel fired operation, the material being carried through the kiln countercurrent to the flame and heated gas. It will be understood, however, that the present procedure is applicable to the treatment of other alumina hydrates, i.e. relatively pure hydrates otherwise produced, and may be performed in connection with the calcining of alumina hydrates by other means, e.g. as in other types of equipment than a rotary kiln, and with heating applied in various ways, for example by combustion of fuel such as hydrogen rather than the conventional hydrocarbons.

The invention is based on the discovery that the objectionable color of fused alumina can be eliminated or at least greatly reduced by a process of converting alumina hydrate to alumina, i.e. before fusing, which comprises calcining the alumina hydrate under reducing conditions. The procedure thus involves subjecting alumina hydrate to calcining treatment at appropriate elevated temperature, while maintaining a reducing atmosphere in contact with the alumina. For instance, the alumina hydrate may be fed countercurrently to the combustion flame and hot gas in a long rotary kiln of conventional type, with conditions adjusted so that the gas provides a reducing atmosphere throughout the kiln. When the calcined alumina is thereafter fused and cooled, it exhibits a desirable whiteness where a like product from the same original hydrate but produced by conventional treatment would be dark colored.

Thus by adjusting, for example, the supply of combustion air to the flame of fuel oil, a carbon monoxide content of say 0.4% to 3% may be maintained in the gases traversing the kiln. This constitutes a reducing atmosphere, as distinguished from the oxidizing atmosphere conventionally maintained in operations for calcining alumina. Indeed it is understood that in treating alumina hydrate heretofore the invariable practice, thought to be necessary for combustion efficiency and other reasons, has been to avoid even a neutral atmosphere, and never to maintain or even occasionally permit a reducing condition of the gas. In the present process, however, it is found that a satisfactory reducing atmosphere may be maintained without objectionable effect on efficiency, especially in the light of the special advantages obtained.

The precise function of the reducing atmosphere is not known, but the improved results of the invention, with respect to the color or whiteness of the alumina after subsequent fusing, have been fully established. Although the immediate, finely divided product of the calcining operation of the present process does not have any different appearance from the product of conventional calcination, i.e. in that both are entirely white, the result of subsequent fusing of alumina produced by the present method is a material that has good whiteness, in marked contrast to the frequent grey color in the fused product from conventional alumina.

The process, therefore, embraces the treatment of alumina hydrate, such as finely divided alumina trihydrate resulting from the Bayer process, by a calcination where a reducing atmosphere is maintained, the calcining being at a temperature appropriate for the desired conversion to alumina, for example within the general range of 250° to 1550° C. Using the conventional, long rotary kiln, the hydrate is continuously fed into the so-called cold end of the kiln. The kiln is suitably heated, for instance with an exposed flame projected into the outlet end, being fired with fuel oil or the like. Instead of the conventional operation with a slight excess of air, the proportion of fuel to combustion air as supplied to the burner is adjusted to yield the desired reducing atmosphere through the kiln, e.g. as by increasing the rate of fuel supply while keeping the same fixed rate of addition of combustion air.

For instance, instead of regulating the fuel and air ratio so that there is up to 5% excess of air (beyond the requirements of combustion), the ratio is made such as to eliminate the air excess and to provide a slight incompleteness of combustion, with consequent appearance of minor proportions of carbon monoxide in the hot gas. The attainment of the desired condition, i.e. as to maintenance of a reducing atmosphere, can be readily tested or checked by conventional means, for example with a simple analysis of the flue gases leaving the cold end of the kiln.

With the kiln thus fired and rotating, with a reducing atmosphere maintained throughout, the alumina material travels continuously along it in such atmosphere, and is discharged as finely divided alumina at the hot or outlet end. If desired, the alumina can be cooled in a conventional manner. Upon thereafter fusing the alumina so produced, e.g. as by melting it in a carbon arc furnace and obtaining an ultimately solidified block or the like, it is found that the material, as observed upon breaking or crushing the block, is truly white, or at least exhibits very marked reduction of any color which would characterize alumina calcined in an oxidizing atmosphere and similarly fused and solidified.

The desired reducing atmosphere is attained when the gases in the kiln, from combustion, contain at least about 0.4% carbon monoxide, by volume. The provision of somewhat higher concentrations of the latter, extending up to 3% or more (by volume), will in most cases yield further improvement in the color of the alumina after fusing, i.e. greater whiteness. Although in some instances it may be useful to employ a still larger quantity of CO (e.g. twice as much), it appears generally unnecessary to maintain more than about 3% CO in the kiln atmosphere; these conditions may be readily achieved without appreciable sacrifice of heating efficiency, or other undesirable effects.

It will be understood that other types of reducing atmosphere may be used, for instance as represented by a content of hydrogen instead of carbon monoxide or by a mixture of hydrogen and carbon monoxide. For instance where a fuel such as hydrogen is used, the combustion conditions should be adjusted so that hydrogen is present in the hot gases to an extent equivalent in reducing effect to at least about 0.4% carbon monoxide. Thus the reducing atmosphere may be further defined, for preferred practice of the invention, as one containing not more than about 0.05% oxygen and at least about 0.4% total carbon monoxide and hydrogen, or for best assurance of maintaining reducing conditions, a total carbon monoxide and hydrogen content (or content of at least one of these gases) which is in excess of 0.5%, the latter limit being a special or further feature of the invention. As stated, the character of the atmosphere in the kiln can be readily determined, at necessary times, by gas analysis, of conventional type, on the flue gas discharged from the cold end of the apparatus.

In most operations with alumina hydrate produced by the Bayer process, calcination is effected in a range of 1000° to 1550° C., and in general most economically between 1000° and 1400° C. Tests have indicated that the improved process of the present invention for use in producing a white fusing alumina, is more effective at somewhat higher temperatures than might otherwise be employed for calcination. For instance, temperatures in the middle and upper part of the last-mentioned range are therefore preferred for the present procedure, in the treatment of Bayer process trihydrate.

The following are specific examples of prior practice and of the improved process: Finely divided alumina trihydrate, resulting from the Bayer process, was calcined by passage through a long rotary kiln at about 1100° C., countercurrent to the flame and hot gas. The kiln was fired with an open flame using mineral-free fuel oil, combustion conditions being such that the flue gas contained a small excess of air and there was therefore the conventional oxidizing condition in the kiln. The product of the kiln, a white calcined alumina in finely divided form, was subjected to fusing in a Higgins shell furnace. After solidification, the resulting block of fused alumina was broken and found to be colored dark grey.

In accordance with the preferred practice of the present invention, the same alumina trihydrate was calcined in the same kiln, at the same temperature, i.e. about 1100° C., but the conditions of combustion of the fuel oil were adjusted, with respect to proportions of fuel and air, so that the gases contained approximately 3% carbon monoxide. The alumina product from the kiln had the same white appearance as in the other operation. However, after fusion of the product in the Higgins furnace, and breaking the solid block thereby obtained, the fused alumina was found to show a very satisfactory white color, i.e. lacking the objectionable darkness.

Although similar tests showed some lightening of the grey in the fused block where calcination was effected in the neutral atmosphere (0.1% to 0.3% carbon monoxide), the present contemplation of the invention is that a reducing atmosphere should be employed; significantly useful results are thus obtained when the gas in the kiln contains 0.4% carbon monoxide or more.

In the above and other tests of the improved process, utilizing a reducing atmosphere, it was found that an increase of the calcination temperature, for example from 1100° to 1200° C., afforded still further improvement in the whiteness of the alumina after fusing. In the various operations here described and in respects other than the atmosphere and in some instances the temperature, the conditions of handling the material in the kiln, for example as to time of travel of the material and as to rate of rotation, were entirely conventional and thus such as are well known in the art of calcining alumina hydrate to convert it to alumina.

It is to be understood that the invention is not limited to the specific operations hereinabove described but may be carried out in other ways without departure from its spirit.

I claim:

1. In a process of preparing fused alumina by calcining substantially pure alumina hydrate to convert such hydrate to alumina and thereafter fusing the calcined alumina and obtaining a solidified fused product, the improvement in said process, to inhibit darkening of said alumina upon said fusing thereof, which consists in performing the said calcining of the said alumina hydrate at a temperature of about 1000° C. to about 1550° C. to convert it to unfused alumina while maintaining it in a reducing atmosphere containing about 0.5% to 6% total of carbon monoxide and hydrogen, said calcining consisting in heating the said substantially pure alumina hydrate by direct flame produced by oil fuel and controlled in mutual supply of fuel and air to provide said reducing atmosphere and to yield a white unfused alumina which does not darken substantially on the aforesaid fusing thereof.

2. In a process of preparing fused alumina by calcining substantially pure alumina hydrate to convert such hydrate to alumina and thereafter fusing the calcined alumina and obtaining a solidified fused product, the improvement in said process, to inhibit darkening of said alumina upon said fusing thereof, which consists in performing the said calcining of the said alumina hydrate at a temperature of about 1000° C. to about 1550° C. to convert it to unfused alumina while maintaining it in a reducing atmosphere containing about 3% carbon monoxide, said calcining consisting in heating the said substantially pure alumina hydrate by direct flame produced by oil fuel and controlled in mutual supply of fuel and air to provide said reducing atmosphere and to yield a white unfused alumina which does not darken substantially on the aforesaid fusing thereof.

References Cited in the file of this patent

UNITED STATES PATENTS

| | | |
|---|---|---|
| 1,161,620 | Coulter | Nov. 23, 1915 |
| 1,326,595 | Hutchins | Dec. 30, 1919 |
| 1,662,739 | Curtis | Mar. 13, 1928 |
| 1,816,842 | Haglund | Aug. 4, 1931 |
| 1,871,792 | Horsfield | Aug. 16, 1932 |
| 2,833,621 | Reeve | May 6, 1958 |